United States Patent
Kim et al.

(10) Patent No.: US 10,503,422 B2
(45) Date of Patent: Dec. 10, 2019

(54) MEMORY PROTECTION DEVICE AND METHOD AND ORGANIC LIGHT EMITTING DISPLAY DEVICE INCLUDING THE SAME

(71) Applicant: LG DISPLAY CO., LTD., Seoul (KR)

(72) Inventors: Hyojin Kim, Paju-si (KR); Suhyuk Jang, Paju-si (KR); Sungwan Hong, Seoul (KR)

(73) Assignee: LG DISPLAY CO., LTD., Seoul (KR)

(*) Notice: Subject to any disclaimer, the term of this patent is extended or adjusted under 35 U.S.C. 154(b) by 505 days.

(21) Appl. No.: 15/333,482

(22) Filed: Oct. 25, 2016

(65) Prior Publication Data

US 2017/0123668 A1 May 4, 2017

(30) Foreign Application Priority Data

Oct. 29, 2015 (KR) .................. 10-2015-0151339

(51) Int. Cl.
*G06F 3/06* (2006.01)
*G09G 3/20* (2006.01)
(Continued)

(52) U.S. Cl.
CPC ............ *G06F 3/064* (2013.01); *G06F 3/0623* (2013.01); *G06F 3/0679* (2013.01); *G09G 3/2096* (2013.01); *G09G 3/3208* (2013.01); *G09G 3/3291* (2013.01); *G09G 5/393* (2013.01); *H04N 19/44* (2014.11); *G09G 2300/0814* (2013.01); *G09G 2300/0852* (2013.01); *G09G 2300/0861* (2013.01); *G09G 2300/0876* (2013.01); *G09G 2320/0233* (2013.01); *G09G 2320/0285* (2013.01); *G09G 2340/16* (2013.01);
(Continued)

(58) Field of Classification Search
CPC ...... G06F 3/0623; G06F 3/064; G06F 3/0679; G09G 2300/0814; G09G 2300/0861; G09G 2320/0233; G09G 2320/0285; G09G 2340/16; G09G 2360/12; G09G 2360/18; G09G 3/2096; G09G 3/3208; H04N 19/44
See application file for complete search history.

(56) References Cited

U.S. PATENT DOCUMENTS 5,475,431 A * 12/1995 Tsukagoshi ............ H04N 19/61
348/699
8,156,343 B2 * 4/2012 Robinson ................ G06F 21/71
711/152

(Continued)

FOREIGN PATENT DOCUMENTS

| CN | 1886711 A | 12/2006 |
|---|---|---|
| CN | 101859536 A | 10/2010 |
| CN | 102237998 A | 11/2011 |

*Primary Examiner* — Sing-Wai Wu
(74) *Attorney, Agent, or Firm* — Dentons US LLP

(57) ABSTRACT

A memory protection device for protecting information stored in a memory includes a transmission block processing transmission data including state information of a display panel to generate original data in compliance with a transmission interface standard, an encoding unit connected to an output terminal of the transmission block and modulating a portion of the original data so as to be different from an original value to generate encoding data, and an inputoutput controller writing the encoding data into the memory according to the transmission interface standard.

15 Claims, 9 Drawing Sheets

(51) Int. Cl.
  *G09G 3/3208* (2016.01)
  *G09G 5/393* (2006.01)
  *H04N 19/44* (2014.01)
  *G09G 3/3291* (2016.01)

(52) U.S. Cl.
  CPC ..... *G09G 2360/12* (2013.01); *G09G 2360/18* (2013.01)

(56) References Cited

U.S. PATENT DOCUMENTS

2010/0253608 A1* 10/2010 Kim .................... G09G 3/3233
 345/76
2013/0275772 A1 10/2013 Robinson et al.

\* cited by examiner (A) Original Data  (B) Encoding Data

|  | 32bit Data | R/G/B |
|---|---|---|
| Original Data | DF070988 | 496d/450d/392d |
| Rx IC Sample Data | 750D0B88 | 848d/834d/904d |
| Decoding Data | DF070988 | 496d/450d/392d |

(A): DEGRADED PANEL DRIVING SCREEN (B): SENSING DATA AFTER APPLICATION OF PRESENT DISCLOSURE

MEMORY PROTECTION DEVICE AND METHOD AND ORGANIC LIGHT EMITTING DISPLAY DEVICE INCLUDING THE SAME

This application claims the benefit of Korea Patent Application No. 10-2015-0151339 filed on Oct. 29, 2015, which is incorporated herein by reference for all purposes as if fully set forth herein.

BACKGROUND OF THE INVENTION

Field of the Invention

The present disclosure relates to a memory protection device and method and an organic light emitting display device including the same.

Discussion of the Related Art

An active matrix type organic light emitting display device includes a self-luminous organic light emitting diode (OLED) and has many advantages such as fast response speed, high emission efficiency, high luminance, and wide viewing angle.

An OLED typically includes an anode electrode, a cathode electrode, and organic compound layers (hole injection layer (HIL), a hole transport layer (HTL), an emission layer (EML), an electron transport layer (ETL), and an electron injection layer (EIL)) formed therebetween. The organic compound layers include the HIL, HTL, EML, ETL, and EIL. When a driving voltage is applied between the anode electrode and the cathode electrode, holes which have passed through the HTL and electrons which have passed through the ETL move to the EML to form excitons, resultantly causing the EML to emit visible light.

In an organic light emitting display device, pixels each including an OLED are arranged in a matrix and the brightness of each pixel is adjusted according to a gray level of video data. Each pixel may include a driving element, e.g., a driving thin film transistor (TFT), for controlling a driving current flowing in the OLED according to a voltage applied between a gate electrode and a source electrode thereof. The OLED and the driving TFT are changed in electrical characteristics due to temperature or degradation. If the electrical characteristics of the OLED andor the driving TFT differ in pixels, the brightness of pixels varies with respect to the same video data, making it difficult to implement a desired image.

In order to compensate for a change in electrical characteristics regarding the OLED and the driving TFT, an external compensation technique is known. According to an external compensation technique, when a change in electrical characteristics of the OLED or the driving TFT is sensed, the sensing value is stored in a memory and digital video data is modulated by a compensation value based on the sensing value. The sensing and compensating operation may be frequently performed under the control of a timing controller while an organic light emitting display device is being driven. The timing controller may control a write operation regarding the memory to write a new sensing value in a first region of the memory, thus updating the sensing value. The timing controller may read out a compensation value stored in a second region of the memory by controlling a read operation regarding the memory.

The sensing value stored in the memory represents a degree of degradation of a panel, a dark spot, a line dim, or panel characteristics. For example, in a case in which a display panel is degraded and a compensation process is not applied, a degradation pattern as illustrated in FIG. 1 overlaps a display image so as to be visible, and such a degradation pattern is reflected in the sensing value and stored in a memory. Here, as illustrated in FIG. 2, the sensing value stored in the memory has a form similar to the degradation pattern of FIG. 1.

The memory may be a flash type general-purpose integrated circuit (IC), and thus, every one may read out information stored in the memory. In particular, when data of the memory is divided to a size corresponding to the resolution of a display panel, information regarding a state of the display panel may be easily analyzed. A method for protecting panel state information stored in a memory would be beneficial.

SUMMARY

Accordingly, the present disclosure is directed to a memory protection device and method and an organic light emitting display device including the same that substantially obviate one or more problems due to limitations and disadvantages of the related art.

An advantage of the present disclosure is to provide a memory protection device and method capable of protecting panel state information stored in a memory, and an organic light emitting display device including the same.

Additional features and advantages of the present disclosure will be set forth in the description which follows, and in part will be apparent from the description, or may be learned by practice of the invention. These and other advantages of the present invention will be realized and attained by the structure particularly pointed out in the written description and claims hereof as well as the appended drawings.

To achieve these and other advantages and in accordance with the purpose of embodiments of the invention, as embodied and broadly described herein, a memory protection device for protecting information stored in a memory may, for example, include a transmission block processing transmission data including state information of a display panel to generate original data in compliance with a transmission interface standard; an encoding unit connected to an output terminal of the transmission block and modulating a portion of the original data so as to be different from an original value to generate encoding data; and an input/output controller writing the encoding data into the memory according to the transmission interface standard.

The memory protection device may further include: a decoding unit inversely modulating encoding data read out from the memory by the input/output controller to generate decoding data which is the same as the original data; a reception block processing the decoding data to generate reception data which is the same as the transmission data; and a logic unit calculating a difference value between transmission data of an Nth (N is a positive integer) frame and reception data of an (N−1)th frame and modulating digital video data to be input to the display panel on the basis of a compensation value in accordance with the difference value.

A portion of the encoding data may be different from the original data, and the remainder, excluding the portion, of the encoding data may be the same as the original data.

The encoding unit and the decoding unit may each include a plurality of logic gates, and the logic gates include an XOR gate implementing XOR.

The encoding unit may XOR first original data and second original data through the XOR gate and outputs first encoding data having a value different from each of the first original data and the second original data, and output any one of the first original data and the second original data, as second encoding data as is.

According to another aspect, an organic light emitting display device may, for example, include a display panel; a memory that stores state information of the display panel; and a memory protection device that protects the state information stored in the memory, wherein the memory protection device comprises: a transmission block that processes transmission data including the state information of the display panel to generate original data in compliance with a transmission interface standard; an encoding unit connected to an output terminal of the transmission block that modulates a portion of the original data so as to be different from an original value to generate encoding data; and an input/output controller that writes the encoding data into the memory according to the transmission interface standard.

According to another aspect, a memory protection method for protecting information stored in a memory may, for example, include processing transmission data including state information of a display panel to generate original data in compliance with a transmission interface standard; modulating a portion of the original data so as to be different from an original value to generate encoding data; and writing the encoding data into the memory according to the transmission interface standard.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Hereinafter, an embodiment of the present disclosure will be described with reference to FIGS. 3 to 14.

FIGS. 3 to 11 are views illustrating a memory protection device according to an embodiment of the present disclosure. The memory protection device according to an embodiment of the present disclosure is provided to encrypting panel state information stored in a memory in advance so as not to be easily analyzed. The memory protection device according to an embodiment of the present disclosure may be installed in the timing controller 11, but the present disclosure is not limited thereto.

Figure 1:
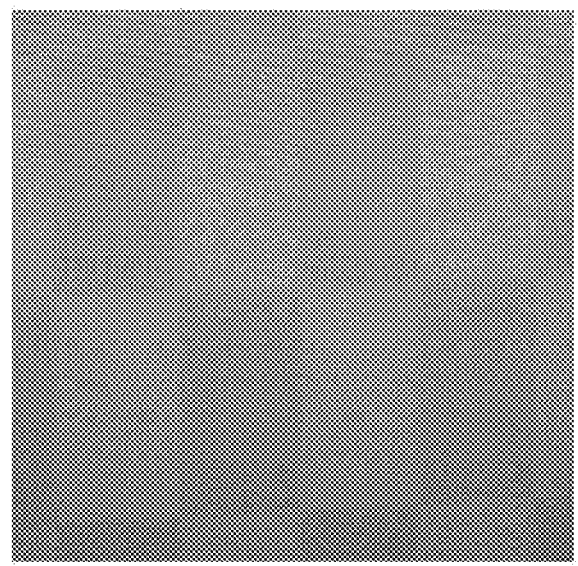
FIG. 1 is a view illustrating an example of a driving screen of a display panel degraded in a state in which a compensation process is not applied.
Figure 2:
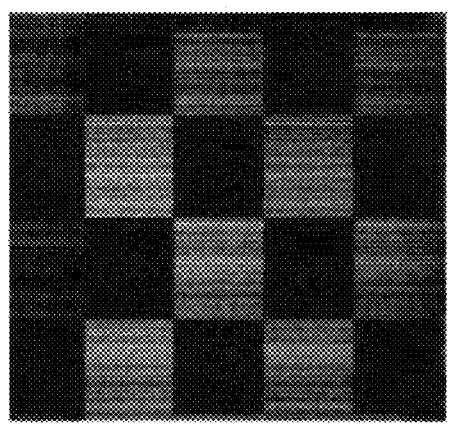
FIG. 2 is a view illustrating a sensing value stored in a memory to correspond to a degradation pattern of FIG. 1.
Figure 3:
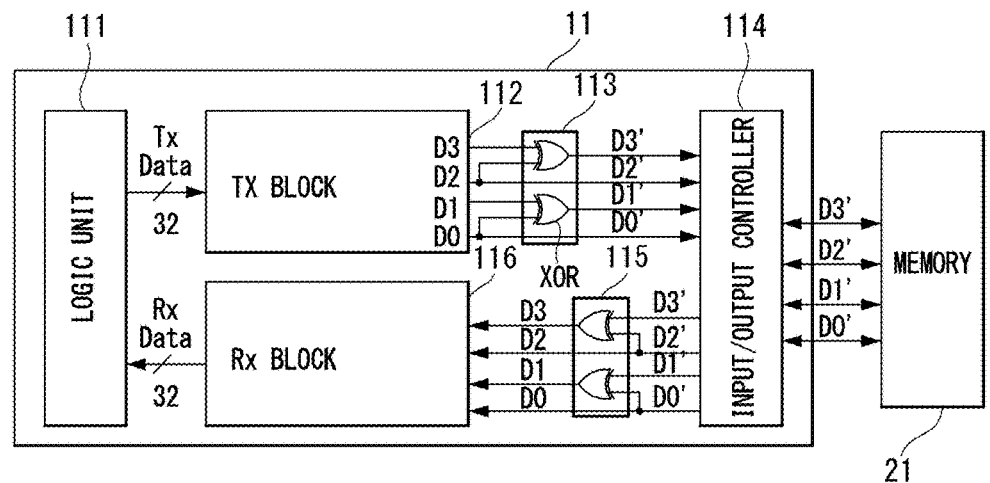
FIG. 3 is a view illustrating a specific configuration of a memory protection device according to an embodiment of the present disclosure.

Referring to FIG. 3, the memory protection device includes a transmission (Tx) block 112, an encoding unit 113, and an input/output controller 114 and encrypts information stored in the memory 21.

The Tx block 112 receives Tx data including state information of a display panel from a logic unit 111 and processes the Tx data through a data split process, a serialization process, and the like, to generate original data D3, D2, D1, and D0 according to a transmission interface standard. In an embodiment of the present disclosure, the transmission interface standard between the memory protection device and the memory 21 is implemented as a quad serial peripheral interface (SPI). In the quad SPI, four transmission lines are provided between the memory protection device and the memory 21. Also, in an embodiment of the present disclosure, a transmission unit of Tx data is implemented as 32 bits including 10-bit R (red) data, 10-bit G (green) data, 10-bit B (blue) data, and 2-bit dummy data. However, the transmission interface standard and the transmission unit of Tx data may vary depending on a model.

In the quad SPI, since data is transmitted in units of 4 bits, the Tx block 112 splits 32-bit Tx data into eight pieces of 4-bit data and serializes the eight pieces of split data to generate original data D3, D2, D1, and D0. D0 is a data stream including the most significant bit (MSB) of each of the eight pieces of split data. D1 is a data stream including a second least significant bit of each of the eight pieces of split data, and D2 is a data stream including a second most significant bit of each of the eight pieces of split data.

Figure 4:
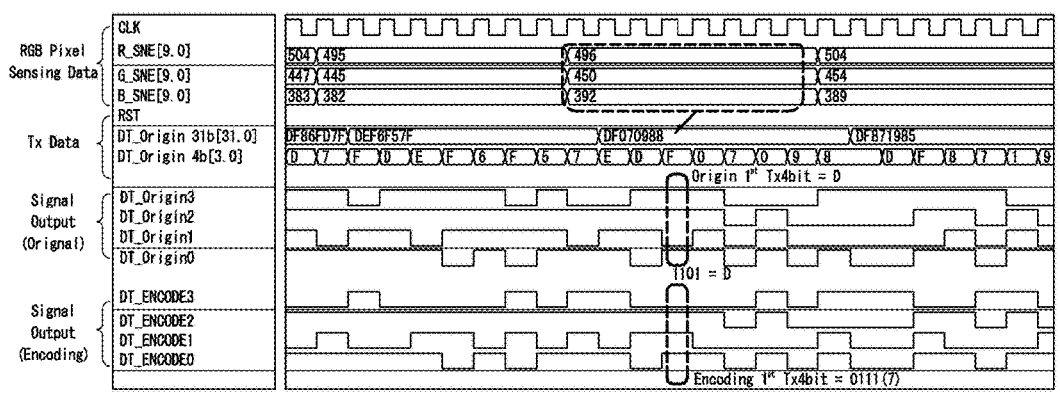
FIGS. 4 to 6 are waveform views comparatively illustrating original data and encoding data employing an embodiment of the present disclosure.

For example, as illustrated in FIG. 4, in a case in which the Tx data includes 10-bit R data having a data value of "496d", 10-bit G data having a data value of "450d", 10-bit B data having a data value of "392d", and 2-bit dummy data, the Tx block 112 processes the Tx data into eight pieces of split data, i.e., "DF070988". "D" is generated as original data of "1101", "F" is generated as original data of "1111", "0" is generated as original data of "0000", "9" is generated as original data of "1001", and "8" is generated as original data of "1000".

The encoding unit 113 is connected to an output terminal of the Tx block 112 and modulates some of the original data D3, D2, D1, and D0 to be different from the original value to generate encoding data D3', D2', D1', and D0'. The encoding unit 113 includes a plurality of logic gates, and the logic gates may include an XOR (exclusive-OR) gate implementing XOR.

In order to modulate some of the original data D3, D2, D1, and D0 to be different from the original values, the encoding unit 113 may XOR first original data and second original data through the XOR gate to output first encoding data having a value different from each of the first original data and the second original data and to output any one of the first original data and the second original data, as second encoding data as is. Through the encrypting process, some of the encoding data D3', D2', D1', and D0' are changed to be different from the original data D3, D2, D1, and D0, and the remainder excluding some of the encoding data D3', D2', D1', and D0' is maintained to be the same as the original data D3, D2, D1, and D0.

Figure 5:
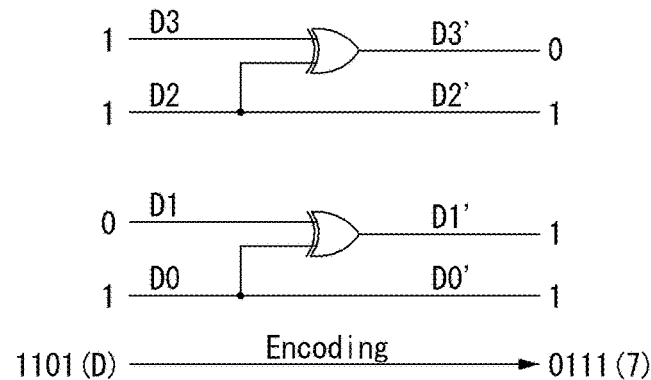

For example, as illustrated in FIGS. 3 and 4, the encoding unit 113 may include a first XOR gate XORing D3 and D2 to generate D3' and a second XOR gate XORing D1 and D0 to generate D1'. Here, the encoding unit 113 may generate D2' and D2 to be the same and D0' and D0 to be the same. Meanwhile, through the XORing, D3' may be generated as a value different from D3 and D2, and D1' may be generated as a value different from D1 and D0. FIG. 5 illustrates that the original data "D" 1101 is modulated to encoding data "7(0111)" by the encoding unit 1113.

The input/output controller 114 writes the encoding data D3', D2', D1', and D0' into the memory 21 through four transmission lines in compliance with the Quad SPI standard. The four transmission lines include a first line transmitting D3', a second line transmitting D2, a third line transmitting D1', and a fourth line transmitting D0'.

Figure 6:
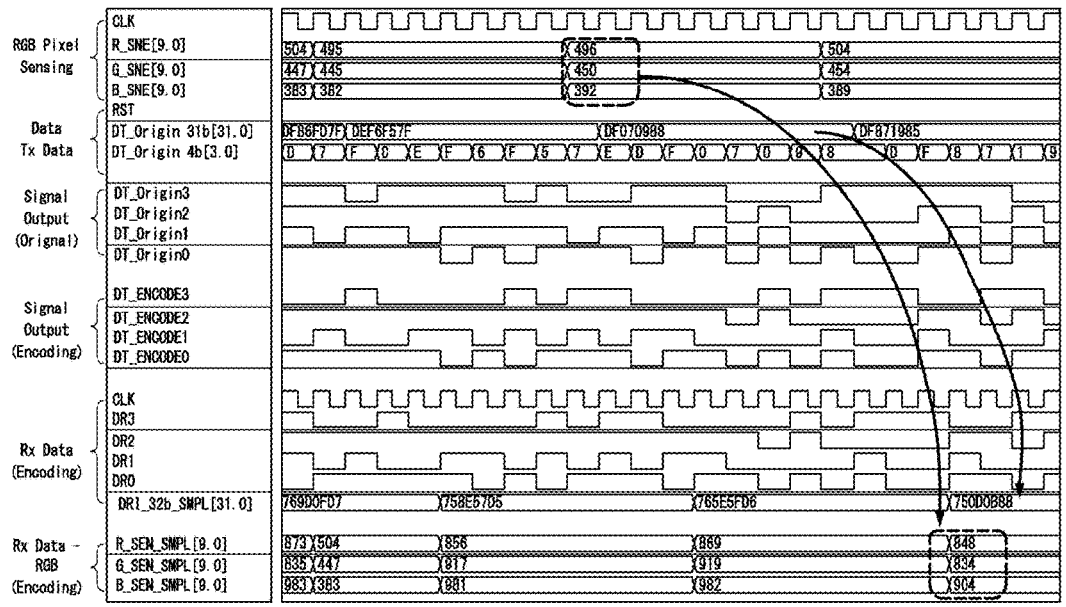
Figure 7:
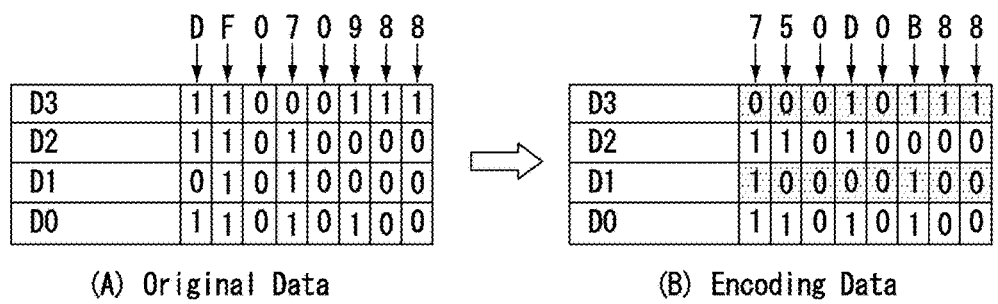
FIG. 7 is a view comparatively illustrating original data transmitted in a quad SPI form and encoding data.

Through the aforementioned encoding process, the original data "DF070988" is modulated to encoding data "750D0B88" as illustrated in FIGS. 6 and 7 and subsequently stored in the memory 16. Since the encoding data "750D0B88" includes R data having a data value "848d", G data having a data value "834d", and B data having a data value "904d", the original data is encrypted to a different value during the encoding process. When the encoding unit 113 is implemented as a logic gate according to an embodiment of the present disclosure, circuit logic is advantageously simplified. In particular, in a case in which only some of the original data D0, D1, D2, and D3 are encrypted through the XOR gate, circuit resource is further reduced. Since it is aimed at reducing or preventing memory information from being easily analyzed, it may be sufficient to modulate only some of the original data into different values during the encoding process for encryption.

The memory protection device according to an embodiment of the present disclosure may further include a decoding unit 115, an Rx block 116, and a logic unit 111, and restore encrypted information stored in the memory 21 and use the restored data in a compensation algorithm.

The decoding unit 115 may inversely modulates the encoding data D3', D2', D1', and D0' read out from the memory 21 by the input/output controller 114 to generate decoding data D3, D2, D1, and D0 which are the same as the original data. As illustrated in FIG. 3, the decoding unit 115 may include a third XOR gate XORing D3' and D2' to generate D3 and a fourth XOR gate XORing D1' and D0' to generate D1. Here, the decoding unit 115 may generate D2 to be the same as D2' and D0 to be the same as D0'.

The Rx block 116 processes the decoding data D3, D2, D1, and D0 to generate Rx data which is the same as Tx data.

Figure 8:
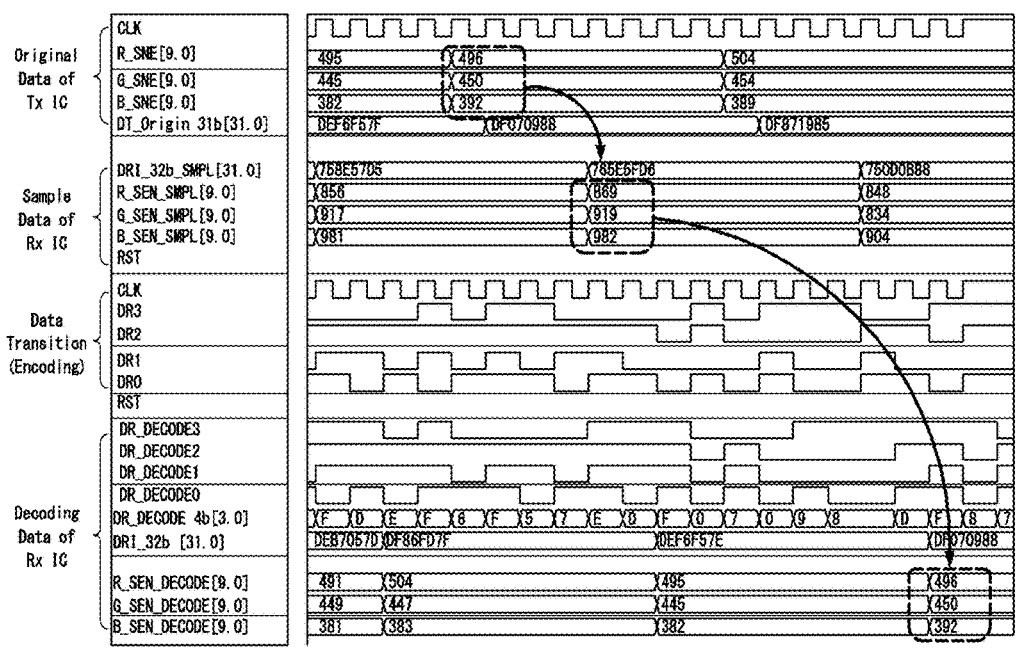
FIG. 8 is a waveform view comparatively illustrating original data and encoding data and decoding data employing an embodiment of the present disclosure.
Figures 9, 10:
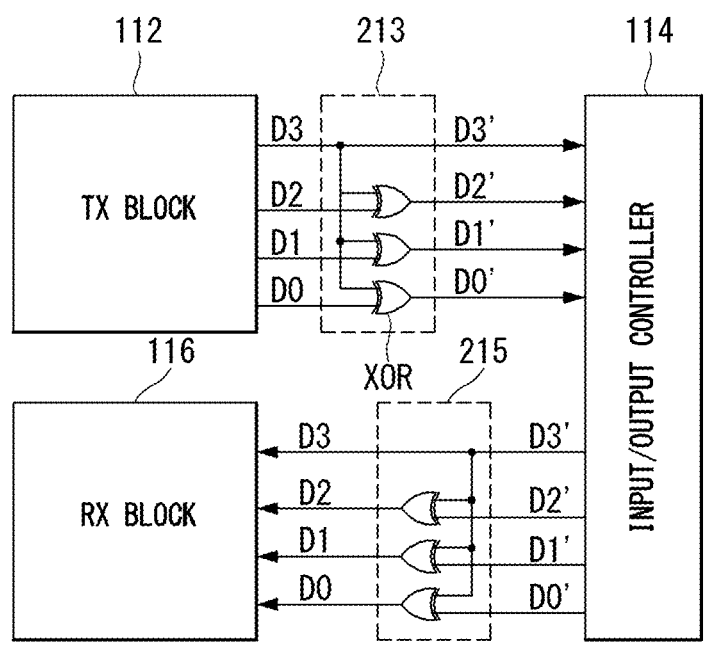
FIG. 9 is a view comparatively illustrating data configurations and data values of original data, encoding data, and decoding data.
FIG. 10 is a view illustrating another example of an encoding unit and a decoding unit included in a memory protection device.

Through the decoding process, the encoding data "750D0B88" is demodulated to decoding data "DF070988" as illustrated in FIGS. 8 and 9. The decoding data "DF070988" is the same as the original data. That is, since the decoding data "DF070988" includes R data having a data value "496d", G data having a data value "450d", and B data having a data value "392d", the encoding data stored in the memory is restored to the original data through the decoding process.

The logic unit 111 may calculate a difference value between the Tx data of an Nth (N is a positive integer) frame and Rx data of (N−1)th frame, and modulate digital video data to be input to the display panel on the basis of the compensation value according to the difference value. The Tx data of the Nth frame includes RGB sensing values regarding the display panel in the Nth frame. The Rx data of the (N−1)th frame includes RGB sensing values regarding the display panel in the (N−1)th frame. The sensing value of each of RGB represents a degree of degradation of the panel, a dark spot, line dim, and panel characteristics. The logic unit 111 compares the RGB sensing values (Tx data) obtained from the display panel in the Nth frame with RGB sensing values (Rx data) of the (N−1)th frame previously stored in the memory 21 to calculate a difference therebetween. Also, the logic unit 111 obtains a compensation value in proportion to the calculated difference value through a preset look-up table, and compensates for digital video data by the compensation value. The Tx data of the Nth frame is transmitted to the memory 21 through the aforementioned encryption process. Then, information stored in the memory 21 is updated from the Tx data of the (N−1)th frame t the Tx data of the Nth frame.

Meanwhile, a technical concept according to an embodiment of the present disclosure is not limited to the XOR gate connection structure of the encoding unit and the decoding unit. For example, the memory protection device according to an embodiment of the present disclosure may include an encoding unit 213 and the decoding unit 215 illustrated in FIG. 10.

In FIG. 10, the encoding unit 213 may include a first XOR gate XORing D3 and D2 to generate D2', a second XOR gate XORing D3 and D1 to generate D1', and a third XOR gate XORing D3 and D0 to generate D0'. The encoding unit 213 may generate D3' and D2 to be the same, and may generate D2', D1', and D0' as values different from D2, D1, and D0 through XORing.

The decoding unit 215 may include a fourth XOR gate XORing D3' and D2' to generate D2, a fifth XOR gate XORing D3' and D1' to generate D1, and a sixth XOR gate XORing D3' and D0' to generate D0. The decoding unit 215 may generate D3 to be the same as D3' and generate D2, D1, and D0 as values different from D2', D1', and D0' through XORing.

Figure 11:
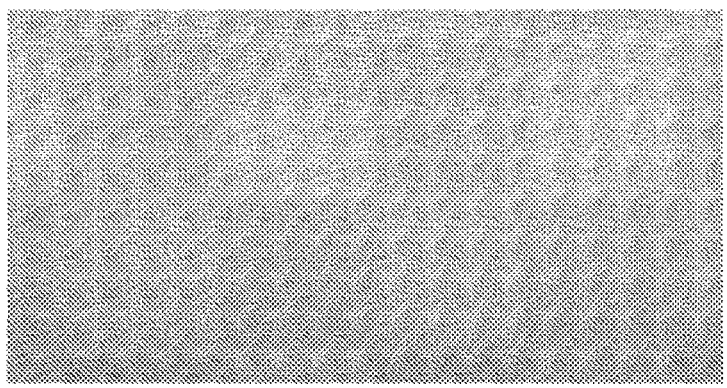
FIG. 11 is a view illustrating an effect of changing memory data from a degraded panel driving screen according to an embodiment of the present disclosure.
Figure 11:
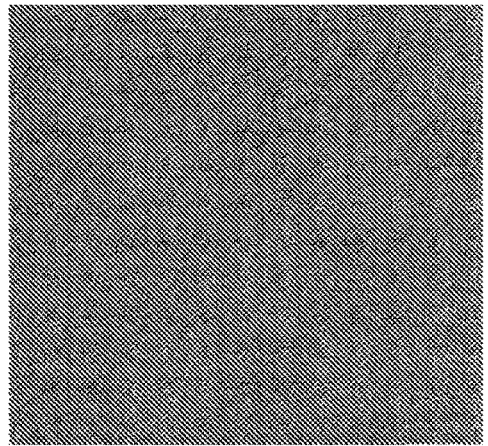

Since the memory 21 is a flash type general-purpose IC, every one can easily read out information stored in the memory. As described above, information regarding a panel state may be easily blocked to be protected by partially modulating information stored in the memory 21. FIG. 11 illustrates an effect of changing memory data from a degraded panel driving screen by applying an embodiment of the present disclosure. Referring to FIG. 11, since the memory data is stored to be different from a panel state through encryption process, although the memory data is analyzed, state information of a panel may not be known.

Figure 12:
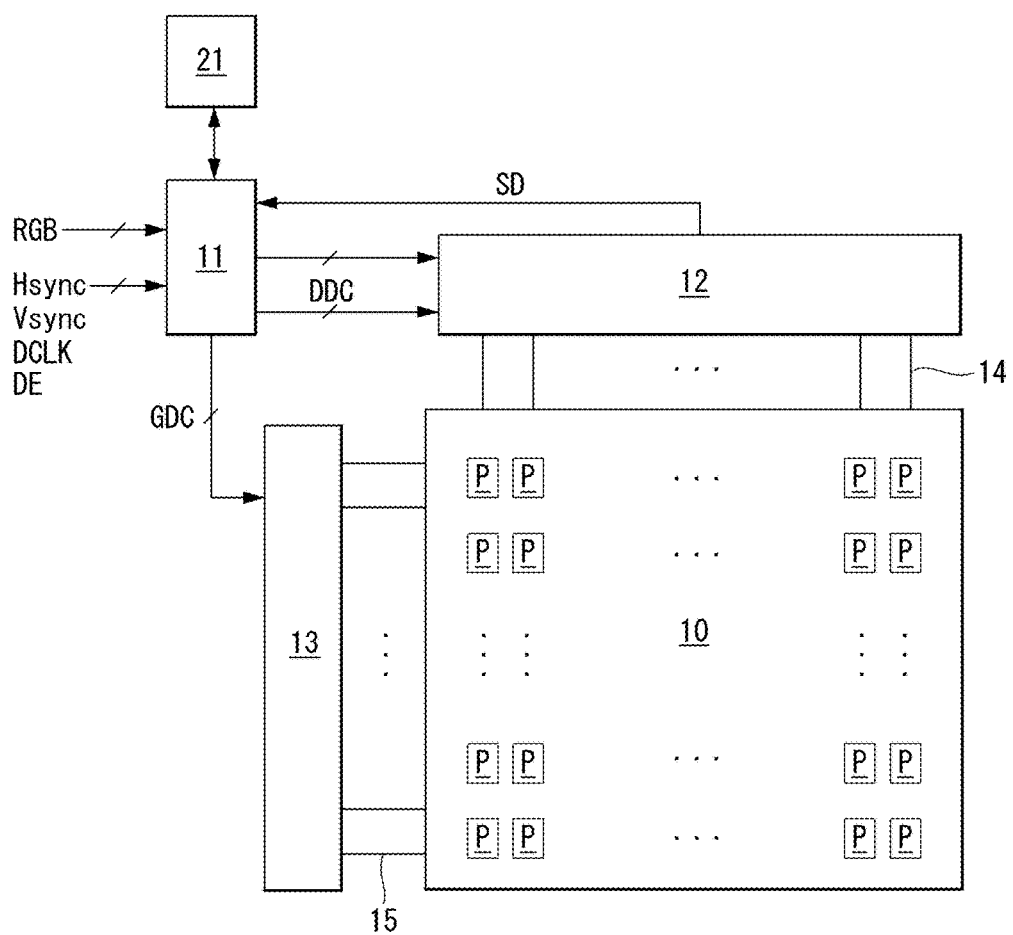
FIG. 12 is a view illustrating an organic light emitting display device including a memory protection device according to an embodiment of the present disclosure.
Figure 13:
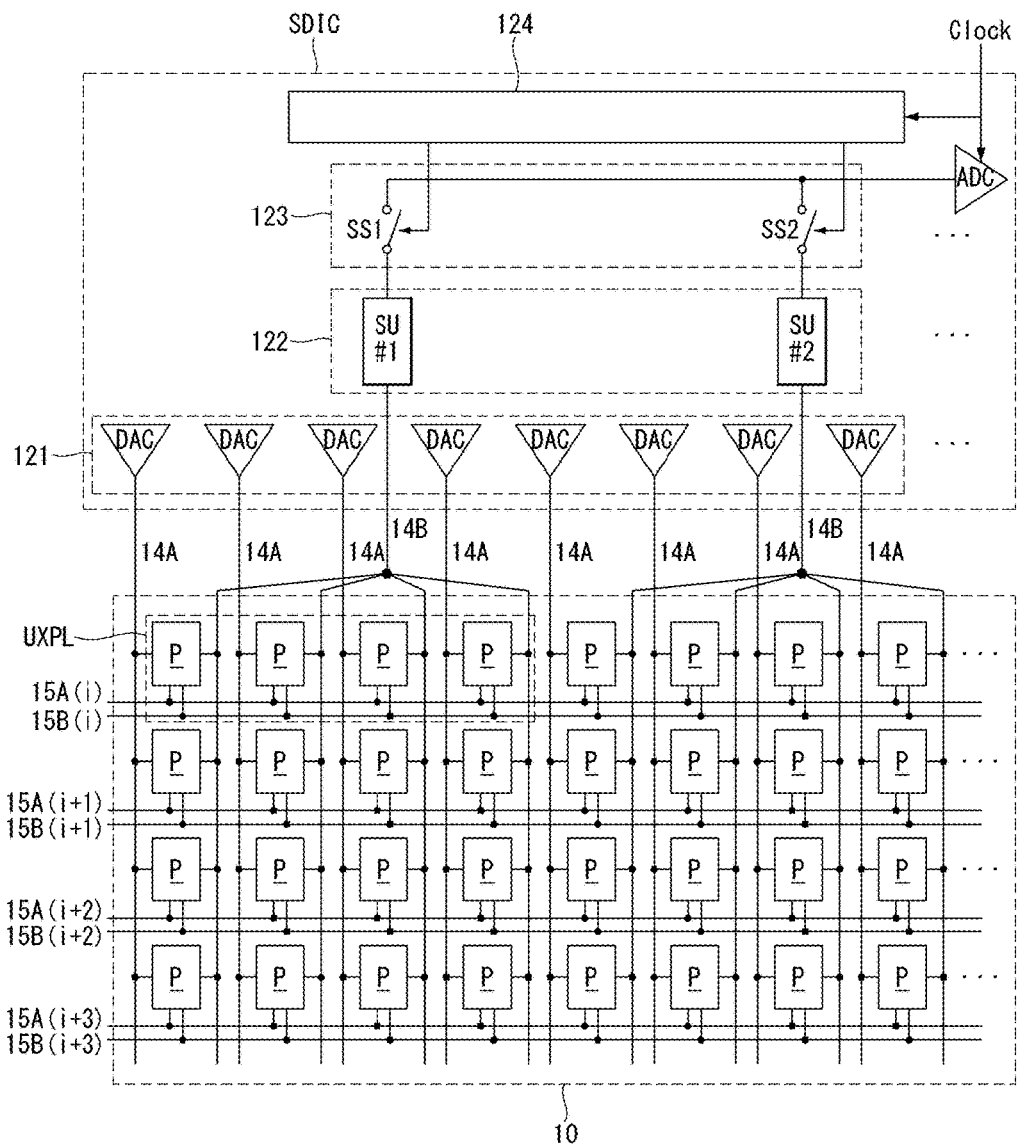
FIG. 13 is a view illustrating a configuration example of a pixel array and a source driver IC.
Figure 14:
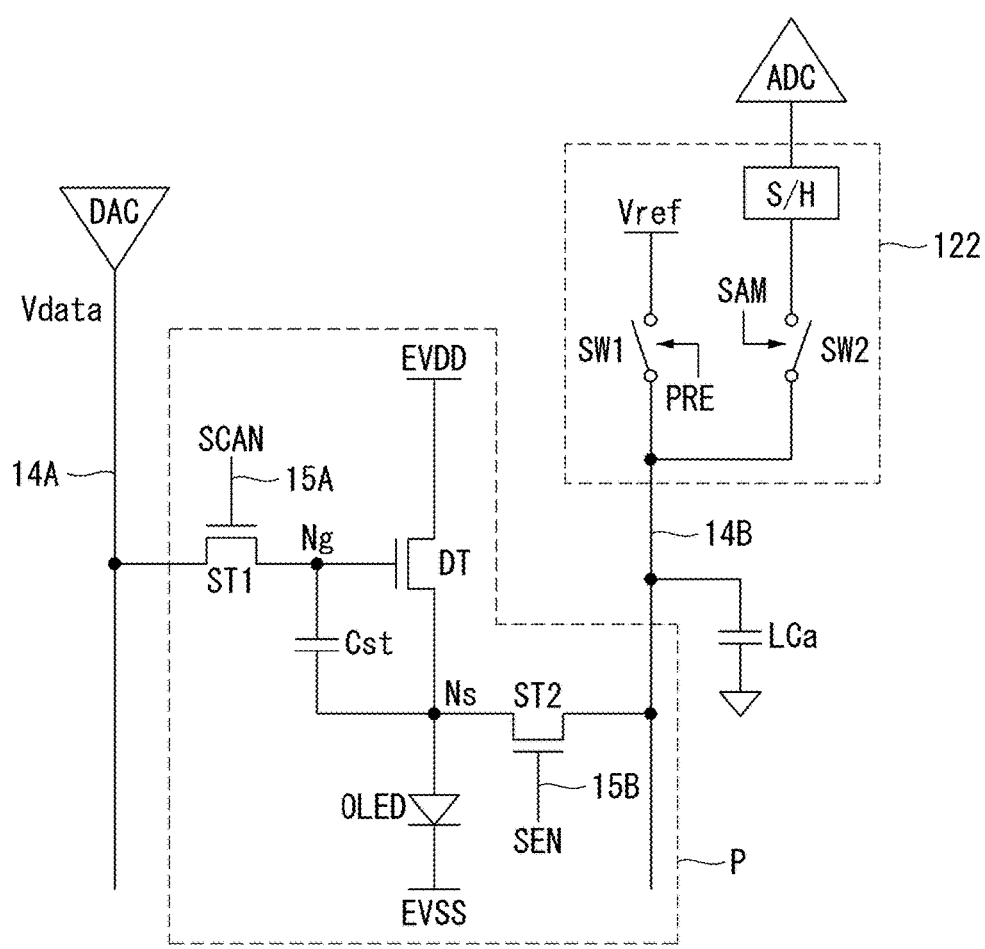
FIG. 14 is a view illustrating a configuration of a pixel and a configuration example of a sensing unit connected thereto.

FIGS. 12 to 14 illustrate an organic light emitting display device including the memory protection device according to an embodiment of the present disclosure.

Referring to FIGS. 12 to 14, the organic light emitting display device according to an embodiment of the present disclosure may include a display panel 10, a memory 21, a timing controller 11 in which a memory protection device is provided, a data driving circuit 12, and a gate driving circuit 13.

A plurality of data lines 14A and sensing lines 14B and a plurality of gate lines 15 intersect with each other on the display panel 10, and external compensation pixels P are disposed in a matrix form at every intersection to form a pixel array. As illustrated in FIG. 13, gate lines 15 may include a plurality of first gate lines 15A to which a scan control signal SCAN is supplied and a plurality of second gate lines 15B to which a sensing control signal SEN is supplied. Although not shown, when the scan control signal SCAN and the sensing control signal SEN are in phase, the first and second gate lines 15A and 15B may be unified.

Each pixel P may be connected to any one of the data lines 14A, any one of the sensing lines 14B, any one of the first gate lines 15A, and any one of the second gate lines 15B. A plurality of pixels P included in a pixel unit UPXL may share one sensing line 14B. The pixel unit UPXL may include four pixels including a red pixel, a green pixel, a blue pixel, and a white pixel, but the present disclosure is not limited thereto. Also, although not shown, pixels included in a pixel unit UPXL may not share a sensing line but independently connected to a plurality of sensing lines. Each pixel P receives a high potential driving voltage EVDD and a low potential driving voltage EVSS from a power generating unit (not shown).

The pixel P according to an embodiment of the present disclosure may have an OLED, a driving TFT DT, a storage capacitor Cst, a first switching TFT ST1, and a second switching TFT ST2. The TFTs may be implemented as P type, N type, or a hybrid type including both P type and N type. Also, a semiconductor layer of the TFT may include amorphous silicon, polysilicon, or an oxide.

The OLED includes an anode electrode connected to a source node Ns, a cathode electrode connected to an input terminal of the low potential driving voltage EVSS, and an organic compound layer positioned between the anode electrode and the cathode electrode. The organic compound layer may include a hole injection layer (HIL), a hole transport layer (HTL), an emission layer (EML), an electron transport layer (ETL), and an electron injection layer (EIL).

The driving TFT DT controls a magnitude of a current (hereinafter, referred to as "Ids") between a source and a drain of the driving TFT DT input to the OLED according to a voltage (hereinafter, referred to as "Vgs"). The driving TFT DT includes a gate electrode connected to a gate node, a drain electrode connected to an input terminal of the high potential driving voltage EVDD, and a source electrode connected to a source node Ns. The storage capacitor Cst is connected between a gate node Ng and a source node Ns to maintain Vgs of the driving TFT DT for a predetermined period of time. The first switching TFT ST1 switches electrical connection between the data line 14A and the gate node Ng according to a scan control signal SCAN. The first switch TFT ST1 includes a gate electrode connected to the first gate line 15A, a drain electrode connected to the data line 14A, and a source electrode connected to the gate node Ng. The second switch ST2 switches electrical connection between the source node Ns and the sensing line 14B according to the sensing control signal SEN. The second switch ST2 includes a gate electrode connected to the second gate line 15B, a drain electrode connected to the sensing line 14B, and a source electrode connected to the source node Ns.

The organic light emitting display device according to an embodiment of the present disclosure having the pixel array employs an external compensation technique. The external compensation technique is a technique of sensing electrical characteristics of the OLED and the driving TFT, and correcting input video data according to the sensing value. The electrical characteristics of the OLED refer to an operating point voltage. The electrical characteristics of the driving TFT refer to a threshold voltage and electron mobility of the driving TFT.

The organic light emitting display device including a pixel array for external compensation is disclosed in Korean Patent Application No. 10-2013-0134256 (dated Nov. 6, 2013), Korean Patent Application No. 10-2013-0141334 (dated Nov. 20, 2013), Korean Patent Application No. 10-2013-0149395 즉 (dated Dec. 3, 2013), Korean Patent Application No. 10-2014-0086901 (dated Jul. 10, 2014), Korean Patent Application No. 10-2014-0079255 (Jun. 26, 2014), Korean Patent Application No. 10-2014-0079587 (Jun. 27, 2014), Korean Patent Application No. 10-2014-0119357 (dated Sep. 5, 2014) filed by the applicant of the present application.

The organic light emitting display device according to an embodiment of the present disclosure performs an image display operation and an external compensation operation. Each time the external compensation operation is performed, a read/write operation may be performed on the memory 21. The data encoding operation as mentioned above accompanies the read operation performed on the memory 21.

The external compensation operation may be performed during a vertical blank period of the image display operation, performed during a power ON sequence period before image displaying starts, or performed during a power OFF sequence period after image displaying is finished. The vertical blank period, a period during which image data is not written, is disposed between vertical active sections in which image data of one frame is written. The power ON sequence period refers to a period from a point in time at which driving power is turned on to a point in time at which an image is displayed. The power OFF sequence period refers to a period from a point in time at which image displaying is finished to a point in time at which driving power is turned off.

The timing controller 11 generates a data control signal DDC for controlling an operation timing of the data driving circuit 12 and a gate control signal GDC for controlling an operation timing of the gate driving circuit 13 on the basis of timing signals such as a vertical synchronization signal Vsync, a horizontal synchronization signal Hsync, a dot clock signal DCLK, a data enable signal DE, and the like. The timing controller 11 may temporally separate a period during which an image is displayed and a period during which external compensation is performed, and generate the control signals DDC and GDC for external compensation to be different.

The gate control signal GDC includes a gate start pulse (GSP), a gate shift clock (GSC), a gate output enable signal (GOE), and the like. The gate start pulse GSP is applied to a gate stage that generates a first scan signal to control the gate stage so that the first scan signal is generated. The gate shift clock GSC is a clock signal commonly input to a plurality of gate stages, and is a clock signal for shifting the gate start pulse GSP. The gate output enable signal GOE is a masking signal that controls outputs of the gate stages.

The gate control signal GDC includes a gate start pulse GSP, a gate shift clock GSC, a gate output enable GOE, and the like. The gate start pulse GSP is applied to the gate stage that generates a first scan signal, and controls the gate stage to generate the first scan signal. The gate shift clock GSC, a clock signal commonly input to gate stages, is a clock signal for shifting the gate start pulse GSP. The gate output enable signal GOD is a masking signal for controlling output of the gate stages.

The data control signal DDC includes a source start pulse SSP, a source sampling clock SSC, a source output enable signal SOE, and the like. The source start pulse SSP controls a data sampling start timing of the data driving circuit 12. The source sampling clock SSC is a clock signal for controlling a sampling timing of data in each of the source drive ICs with respect to a rising or falling edge. The source output enable signal SOE controls an output timing of the data driving circuit 12. The data control signal DDC includes a reference voltage control signal PRE and a sampling control signal SAM for controlling an operation of a sensing unit 122 included in the data driving circuit 12. The reference voltage control signal PRE controls a timing for applying a reference voltage to the sensing line 14B. The sampling control signal SAM controls a timing for sampling an analog sensing value according to an external compensation operation.

The memory protection device included in the timing controller 11 may be substantially the same as that described above with reference to FIGS. 3 to 11.

The data driving circuit 12 includes at least one source driver IC SDIC. The source driver IC SDIC may include a latch array (not shown), a plurality of digital-to-analog converters (DACs) 121 respectively connected to the data lines 14A, a plurality of sensing units 122 respectively connected to the sensing lines 14B, a multiplexer 123 selectively connecting the sensing unit to analog-to-digital converters (ADCs), and a shift register 124 generating a selection control signal and sequentially turning on switches SS1 and SS2 of the multiplexer 123.

The latch array latches various digital data input from the timing controller 11 on the basis of the data control signal DDC and supplies the latched data to the DACs. The DACs may convert the digital video data RGB input from the timing controller 11 into a data voltage for displaying an image, and supply the converted data voltage to the data lines 14A during an operation of displaying an image. The DACs may generate a data voltage for external compensation having a predetermined level and supply the data voltage to the data lines 14A during an external compensation operation.

The sensing unit 122 may supply an initialization voltage Vref to the sensing line 14B on the basis of the data control signal DDC or may sample an analog sensing value (electrical characteristic value regarding the OLED or the driving TFT) input through the sensing line 14B and supply the same to the ADC. The sensing unit 122 may be implemented as a voltage sensing type such that as in FIG. 14.

The voltage sensing type sensing unit 122, which senses a voltage stored in a line capacitor LCa of the sensing line 14B in response to Ids of the driving TFT DT, may have an initialization switch SW1, a sampling switch SW2, and a sample-and-hold unit SH. The initialization switch SW1 switches electrical connection between an input terminal of the initialization voltage Vref and the sensing line 14B according to an initialization control signal PRE. The sampling switch SW2 switches electrical connection between the sensing line 14B and the sample-and-hold unit SH according to a sampling control signal SAM. When a source node voltage of the driving TFT is changed according to Ids of the driving TFT DT, the sample-and-hold unit SH may sample and hold a source node voltage of the driving TFT DT stored in the line capacitor LCa of the sensing line 14B, as an analog sensing value, and transfers the same to the ADC.

The gate driving circuit 13 generates a scan control signal SCAN fitting an image display operation or an external compensation operation on the basis of the gate control signal GDC and subsequently supplies the generated scan control signal SCAN to the first gate lines 15A. The gate driving circuit 13 generates a sensing control signal SEN fitting an image display operation or an external compensation operation on the basis of the gate control signal GDC and subsequently supplies the generated sensing control signal SEN to the second gate lines 15B.

In an embodiment of the present disclosure, the presence or absence of a logic gate may be determined by checking an input/output terminal connected to the memory by cutting an IC including the memory protection device using focused ion beam (FIB) equipment or scanning electron microscope (SEM) equipment, and whether information stored in the memory is modulated to be different from the original value may be recognized by measuring an input/output waveform of a logic gate, and thus, whether an application thereof to a display device may be easily checked.

In this manner, in an embodiment of the present disclosure, since panel state information obtained from the display panel is encoded using a logic gate and subsequently stored in the memory, the panel state information may be effectively blocked without having to use a complicated encryption algorithm.

In addition, in an embodiment of the present disclosure, since a portion of the panel state information is encrypted through the simple XOR gate, circuit resource may be remarkably reduced, while minimizing an increase in cost.

While exemplary embodiments have been shown and described above, it will be apparent to those skilled in the art that modifications and variations could be made without departing from the scope of the present invention as defined by the appended claims.

What is claimed is:

1. A memory protection device for protecting information stored in a memory, the memory protection device comprising:
 a transmission circuit processing transmission data including state information of a display panel to generate original data in compliance with a transmission interface standard;
 an encoding circuit connected to an output terminal of the transmission circuit and modulating a portion of the original data so as to be different from an original value to generate encoding data;
 an input/output controller writing the encoding data into the memory according to the transmission interface standard;
 a decoding circuit inversely modulating encoding data read out from the memory by the input/output controller to generate decoding data which is the same as the original data;
 a reception circuit processing the decoding data to generate reception data which is the same as the transmission data; and
 a logic circuit calculating a difference value between transmission data of an Nth (N is a positive integer) frame and reception data of an (N−1)th frame and modulating an input digital video data on the basis of a compensation value in accordance with the difference value, and generating a modulated digital video data to be input to the display panel, wherein the transmission data of the Nth frame and the reception data of (N−1)th frame are sensing data obtained from the display panel, and wherein the input digital video data and the modulated digital video data have the same bits.

2. The memory protection device of claim 1, wherein a portion of the encoding data is different from the original data, and the remainder, excluding the portion, of the encoding data is the same as the original data.

3. The memory protection device of claim 2, wherein the encoding circuit and the decoding circuit each include a plurality of logic gates, and the logic gates include an exclusive-OR (XOR) gate implementing XOR.

4. The memory protection device of claim 3, wherein the encoding circuit XORs first original data and second original data through the XOR gate and outputs first encoding data having a value different from each of the first original data and the second original data, and outputs any one of the first original data and the second original data, as second encoding data.

5. The memory protection device of claim 1, wherein the transmission data of the Nth frame, the reception data of (N−1)th frame and the modulated digital video data are implemented with the same bits.

6. An organic light emitting display device comprising:
a display panel;
a memory that stores state information of the display panel; and
a memory protection device that protects the state information stored in the memory,
wherein the memory protection device comprises:
a transmission circuit that processes transmission data including the state information of the display panel to generate original data in compliance with a transmission interface standard;
an encoding circuit connected to an output terminal of the transmission circuit that modulates a portion of the original data so as to be different from an original value to generate encoding data;
an input/output controller that writes the encoding data into the memory according to the transmission interface standard;
a decoding circuit inversely modulating encoding data read out from the memory by the input/output controller to generate decoding data which is the same as the original data;
a reception circuit processing the decoding data to generate reception data which is the same as the transmission data; and
a logic circuit calculating a difference value between transmission data of an Nth (N is a positive integer) frame and reception data of an (N−1)th frame and modulating an input digital video data on the basis of a compensation value in accordance with the difference value, and generating a modulated digital video data to be input to the display panel,
wherein the transmission data of the Nth frame and the reception data of (N−1)th frame are sensing data obtained from the display panel, and
wherein the input digital video data and the modulated digital video data have the same bits.

7. The organic light emitting display device of claim 6, wherein a portion of the encoding data is different from the original data, and the remainder, excluding the portion, of the encoding data is the same as the original data.

8. The organic light emitting display device of claim 7, wherein the encoding circuit and the decoding circuit each include a plurality of logic gates, and the logic gates include an exclusive-OR (XOR) gate implementing XOR.

9. The organic light emitting display device of claim 8, wherein the encoding circuit XORs first original data and second original data through the XOR gate and outputs first encoding data having a value different from each of the first original data and the second original data, and outputs any one of the first original data and the second original data, as second encoding data.

10. The organic light emitting display device of claim 6, wherein the transmission data of the Nth frame, the reception data of (N−1)th frame and the modulated digital video data are implemented with the same bits.

11. A memory protection method for protecting information stored in a memory, the memory protection method comprising:
processing transmission data including state information of a display panel to generate original data in compliance with a transmission interface standard;
modulating a portion of the original data so as to be different from an original value to generate encoding data;
writing the encoding data into the memory according to the transmission interface standard;
inversely modulating encoding data read out from the memory to generate decoding data which is the same as the original data;
processing the decoding data to generate reception data which is the same as the transmission data; and
calculating a difference value between transmission data of an Nth (N is a positive integer) frame and reception data of an (N−1)th frame and modulating an input digital video data on the basis of a compensation value in accordance with the difference value, and generating a modulated digital video data to be input to the display panel
wherein the transmission data of the Nth frame and the reception data of (N−1)th frame are sensing data obtained from the display panel, and
wherein the input digital video data and the modulated digital video data have the same bits.

12. The memory protection method of claim 11, wherein a portion of the encoding data is different from the original data, and the remainder, excluding the portion, of the encoding data is the same as the original data.

13. The memory protection method of claim 12, wherein, in the generating of the encoding data and in the generating of the decoding data, exclusive-OR (XORing) is performed through an XOR gate.

14. The memory protection method of claim 13, wherein the generating of the encoding data comprises:
XORing first original data and second original data through the XOR gate and outputting first encoding data having a value different from each of the first original data and the second original data; and
outputting any one of the first original data and the second original data, as second encoding data.

15. The memory protection method of claim 11, wherein the transmission data of the Nth frame, the reception data of (N−1)th frame and the modulated digital video data are implemented with the same bits.

* * * * *